(12) United States Patent
Koyama et al.

(10) Patent No.: US 11,086,014 B2
(45) Date of Patent: Aug. 10, 2021

(54) RANGING DEVICE, RANGING METHOD, SIGNAL PROCESSING DEVICE, AND LIGHT PROJECTING DEVICE

(71) Applicant: SONY CORPORATION, Tokyo (JP)

(72) Inventors: Takahiro Koyama, Kanagawa (JP); Toyoharu Oohata, Tokyo (JP); Tomoki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 406 days.

(21) Appl. No.: 16/070,152

(22) PCT Filed: Oct. 26, 2016

(86) PCT No.: PCT/JP2016/004702
§ 371 (c)(1),
(2) Date: Jul. 13, 2018

(87) PCT Pub. No.: WO2017/134707
PCT Pub. Date: Aug. 10, 2017

(65) Prior Publication Data
US 2019/0033451 A1    Jan. 31, 2019

(30) Foreign Application Priority Data
Feb. 2, 2016   (JP) .............................. JP2016-018183

(51) Int. Cl.
*G01S 17/10* (2020.01)
*G01C 3/06* (2006.01)
(Continued)

(52) U.S. Cl.
CPC ............... *G01S 17/10* (2013.01); *G01C 3/06* (2013.01); *G01S 7/4808* (2013.01); *G01S 7/4865* (2013.01)

(58) Field of Classification Search
CPC ........ G01S 17/42; G01S 17/26; G01S 7/4865; G01S 7/487; G01S 17/10; G01C 3/08
See application file for complete search history.

(56) References Cited

U.S. PATENT DOCUMENTS

| 2009/0195770 A1* | 8/2009 | Satzky ................... G01S 7/497 356/5.01 |
| 2015/0070683 A1* | 3/2015 | Lepere ................... G01S 17/42 356/5.01 |
| 2017/0016981 A1* | 1/2017 | Hinderling .............. G01S 17/42 |

FOREIGN PATENT DOCUMENTS

| JP | 62-047264 A | 2/1987 |
| JP | 2010-151618 A | 7/2010 |

(Continued)

OTHER PUBLICATIONS

International Search Report and Written Opinion of PCT Application No. PCT/JP2016/004702, dated Jan. 17, 2017, 13 pages of ISRWO.

*Primary Examiner* — Luke D Ratcliffe
(74) *Attorney, Agent, or Firm* — Chip Law Group

(57) ABSTRACT

A ranging device provided with a light projecting unit for projecting a reference pulse set row including a main pulse and at least one sub pulse, a light receiving unit for receiving a reflected pulse set row obtained by reflection of the reference pulse set row by an object to be measured, and an identifying unit for identifying the reflected pulse set row corresponding to the reference pulse set row. The ranging device is further provided with a calculating unit for calculating a distance to the object to be measured on the basis of a delay time difference between the reference pulse set row and the reflected pulse set row corresponding to the reference pulse set row. The light projecting unit projects a plurality of reference pulse set rows having different pulse intervals.

9 Claims, 11 Drawing Sheets

(51) Int. Cl.
*G01S 7/48* (2006.01)
*G01S 7/4865* (2020.01)

(56) References Cited

FOREIGN PATENT DOCUMENTS

| | | |
|---|---|---|
| JP | 2013-195117 A | 9/2013 |
| JP | 62-47264 B2 | 12/2017 |
| WO | 2013/094062 A1 | 6/2013 |

* cited by examiner

RANGING DEVICE, RANGING METHOD, SIGNAL PROCESSING DEVICE, AND LIGHT PROJECTING DEVICE

CROSS REFERENCE TO RELATED APPLICATIONS

This application is a U.S. National Phase of International Patent Application No. PCT/JP2016/004702 filed on Oct. 26, 2016, which claims priority benefit of Japanese Patent Application No. JP 2016-018183 filed in the Japan Patent Office on Feb. 2, 2016. Each of the above-referenced applications is hereby incorporated herein by reference in its entirety.

TECHNICAL FIELD

The present disclosure relates to a ranging device, a ranging method, a signal processing device, and a light projecting device.

BACKGROUND ART

A ranging device is proposed which irradiates an object to be measured with an optical pulse and measures time until reflected light thereof returns, thereby measuring a distance to the object to be measured (refer to, for example, Patent Document 1).

CITATION LIST

Patent Document

Patent Document 1: Japanese Patent Application Laid-Open No. 2010-151618

SUMMARY OF THE INVENTION

Problems to be Solved by the Invention

In a field of such a ranging device, it is desired to prevent erroneous calculation of a distance and to calculate the distance with a higher degree of accuracy.

Accordingly, an object of the present disclosure is to provide a measuring device, a ranging method, a signal processing device, and a light projecting device capable of measuring a distance with a higher degree of accuracy.

Solutions to Problems

In order to solve the above problem, the present disclosure is, for example,
a ranging device provided with:
a light projecting unit for projecting a reference pulse set row including a main pulse and at least one sub pulse;
a light receiving unit for receiving a reflected pulse set row obtained by reflection of the reference pulse set row by an object to be measured;
an identifying unit for identifying the reflected pulse set row corresponding to the reference pulse set row; and
a calculating unit for calculating a distance to the object to be measured on the basis of a delay time difference between the reference pulse set row and the reflected pulse set row corresponding to the reference pulse set row,
in which the light projecting unit is configured to project a plurality of reference pulse set rows having different pulse intervals.

The present disclosure is, for example,
a ranging method provided with:
projecting a reference pulse set row including a main pulse and at least one sub pulse by a light projecting unit;
receiving a reflected pulse set row obtained by reflection of the reference pulse set row by an object to be measured by a light receiving unit;
identifying the reflected pulse set row corresponding to the reference pulse set row by an identifying unit; and
calculating a distance to the object to be measured on the basis of a delay time difference between the reference pulse set row and the reflected pulse set row corresponding to the reference pulse set row by a calculating unit,
in which the light projecting unit projects a plurality of reference pulse set rows having different pulse intervals.

The present disclosure is, for example,
a signal processing device provided with:
a light receiving unit for receiving a reflected pulse set row obtained by reflection of a reference pulse set row including a main pulse and at least one sub pulse by an object to be measured; and
an identifying unit for identifying the reflected pulse set row corresponding to a predetermined reference pulse set row out of a plurality of reference pulse set rows having different pulse intervals.

The present disclosure is, for example,
a light projecting device for projecting pulse light for performing optical ranging, provided with:
a light projecting unit configured to project a reference pulse set row including a main pulse and at least one sub pulse and to project a plurality of reference pulse set rows having different pulse intervals.

Effects of the Invention

According to at least one embodiment of the present disclosure, it becomes possible to measure a distance more accurately. Meanwhile, the effect is not necessarily limited to the effect herein described and may be any of the effects described in the present disclosure. Also, the contents of the present disclosure are not interpreted as being limited by the exemplified effect.

MODE FOR CARRYING OUT THE INVENTION

Figure 1:
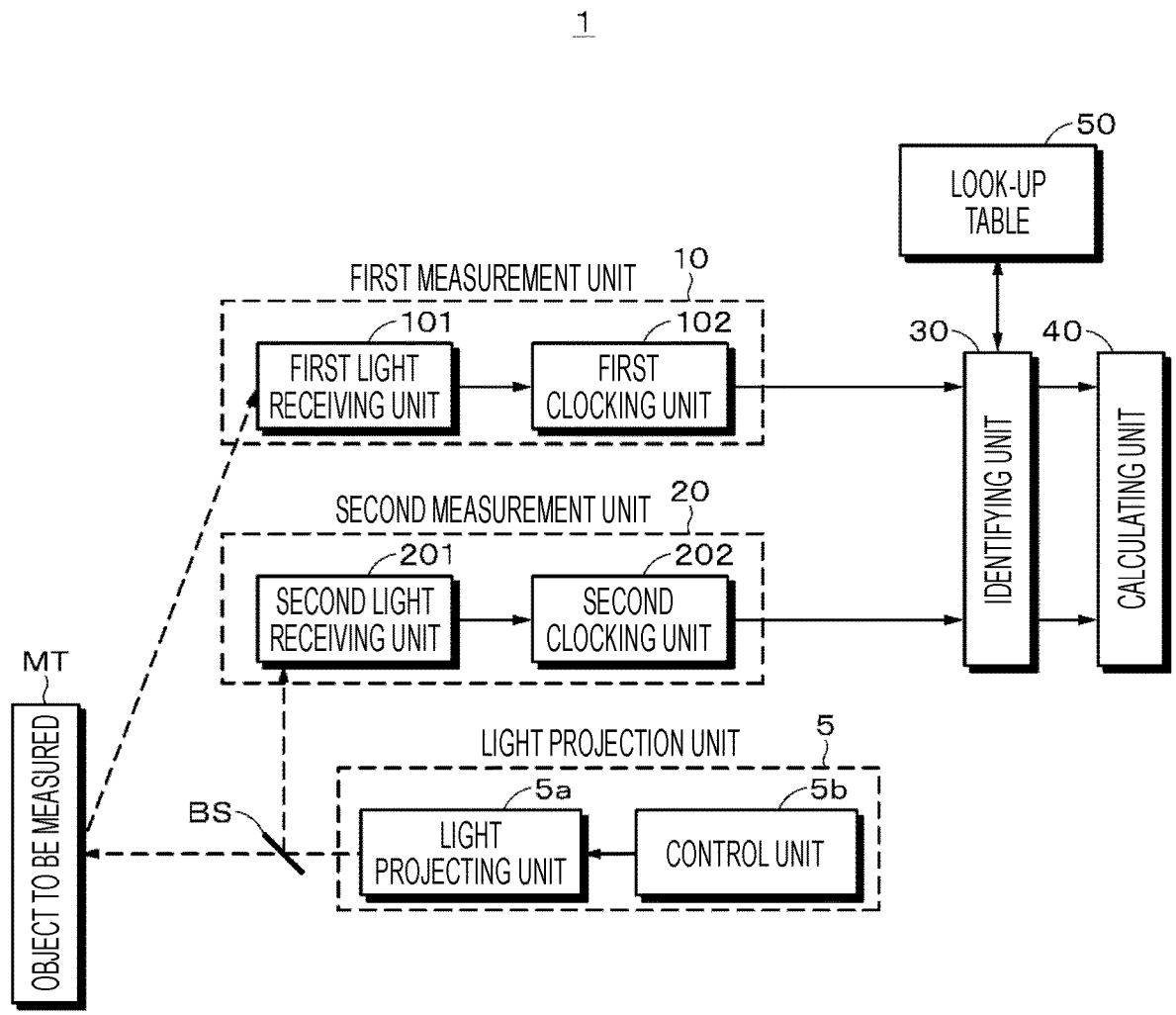
FIG. 1 is a block diagram for illustrating a configuration example of a ranging device according to a first embodiment.

Hereinafter, embodiments and the like of the present disclosure are described with reference to the drawings. Meanwhile, the description is given in the following order.
<1. First Embodiment>
<2. Second Embodiment>
<3. Third Embodiment>
<4. Variation>

The embodiments and the like hereinafter described are preferred specific examples of the present disclosure, and the contents of the present disclosure are not limited to these embodiments and the like.

[Regarding General Ranging Device]

Before describing the embodiments of the present disclosure, a general ranging device is described. Meanwhile, in this specification, for example, a device which performs ranging by an optical method is described as an example.

In the general ranging device, an object to be measured a distance to which is to be measured is irradiated with reference pulse light and time of flight (TOF) required for reflected pulse light thereof to be received is measured. For the purpose of reducing a ranging error, and for multi-point ranging of a stationary object and ranging of a moving object, pulse light is repeatedly projected and the ranging is repeatedly performed in the ranging device.

The reference pulse light repeatedly irradiates the object to be measured, and time $\Delta t$ (second (s)) required for the reflected pulse light corresponding to each reference pulse light and having the same source to be received is sequentially measured. The time $\Delta t$ required for the reflected pulse light to be received varies depending on the distance to the object to be measured, and the longer the distance to the object to be measured, the longer the time $\Delta t$.

Herein, if the distance to the object to be measured is set to L (meter (m)), the reflected pulse light travels a distance of 2L from a projection light source to the object to be measured. The time $\Delta t$ required for this may be expressed as 2L/c by using a light speed c (m/s) as a difference from time when the reference pulse light is applied (hereinafter appropriately referred to as reference time). Therefore, if correct $\Delta t$ may be obtained, correct L may be obtained by $c \times \Delta t/2$.

On the other hand, if a repetition frequency at which the reference pulse light is output is set to f (hertz (Hz)), a period thereof is 1/f (s). In a case where a relationship of 2L/c<1/f holds, that is, in a case where reception time of the reflected pulse light is shorter than the repetition period of output of the reference pulse light, the ranging is sequentially performed without problem.

Also, even in a case where a relationship of 2L/c>1/f holds, that is, even in a case where the reception time of the reflected pulse light is longer than the repetition period of output of the reference pulse light, it is possible to appropriately calculate the distance by counting the reference pulse lights and the reflected pulse lights in detected order, associates the pulse lights of the same number, and obtaining the interval $\Delta t$ between the pulse lights. However, in a case where the distance to the object the distance to which is to be measured rapidly changes and the like, the order of detected reflected pulse lights might be interchanged in some cases. For example, suppose that reference pulse lights SP1 and SP2 are emitted in order. Then, suppose that the reference pulse light SP1 irradiates the object the distance to which is to be measured in a predetermined position and reflected pulse light RP1 returns as the reflected light thereof, and the reference pulse light SP2 irradiates the object the distance to which is to be measured moving to a position closer than the predetermined position and reflected pulse light RP2 returns as the reflected light thereof. Since the time required for the reflected pulse light RP1 to return is longer than time until the reflected pulse light RP2 returns, the reflected pulse light RP2 might be detected first in some cases. That is, since the order of the reflected pulses to be detected is interchanged, it becomes difficult to correctly associate the reference pulse light with the reflected pulse light corresponding to the reference pulse light, and it is not possible to obtain correct $\Delta t$. As a result, it becomes impossible to appropriately perform the ranging, and an erroneous ranging result (erroneous ranging) might be induced. For these reasons, in the general ranging device, the distance to the object to be measured (ranging range) is limited by a repetition period f of the output of the reference pulse light. On the basis of the above points, the embodiments and the like of the present disclosure are described.

1. First Embodiment

[Configuration Example of Ranging Device]

FIG. 1 is a block diagram for illustrating a configuration example of a ranging device (ranging device 1) according to a first embodiment of the present disclosure. The ranging device 1 is provided with, for example, a light projection unit 5 as an example of a light projecting unit, a first measurement unit 10, a second measurement unit 20, an identifying unit 30, a calculating unit 40, and a look-up table 50 as an example of a storage unit.

Figure 2:
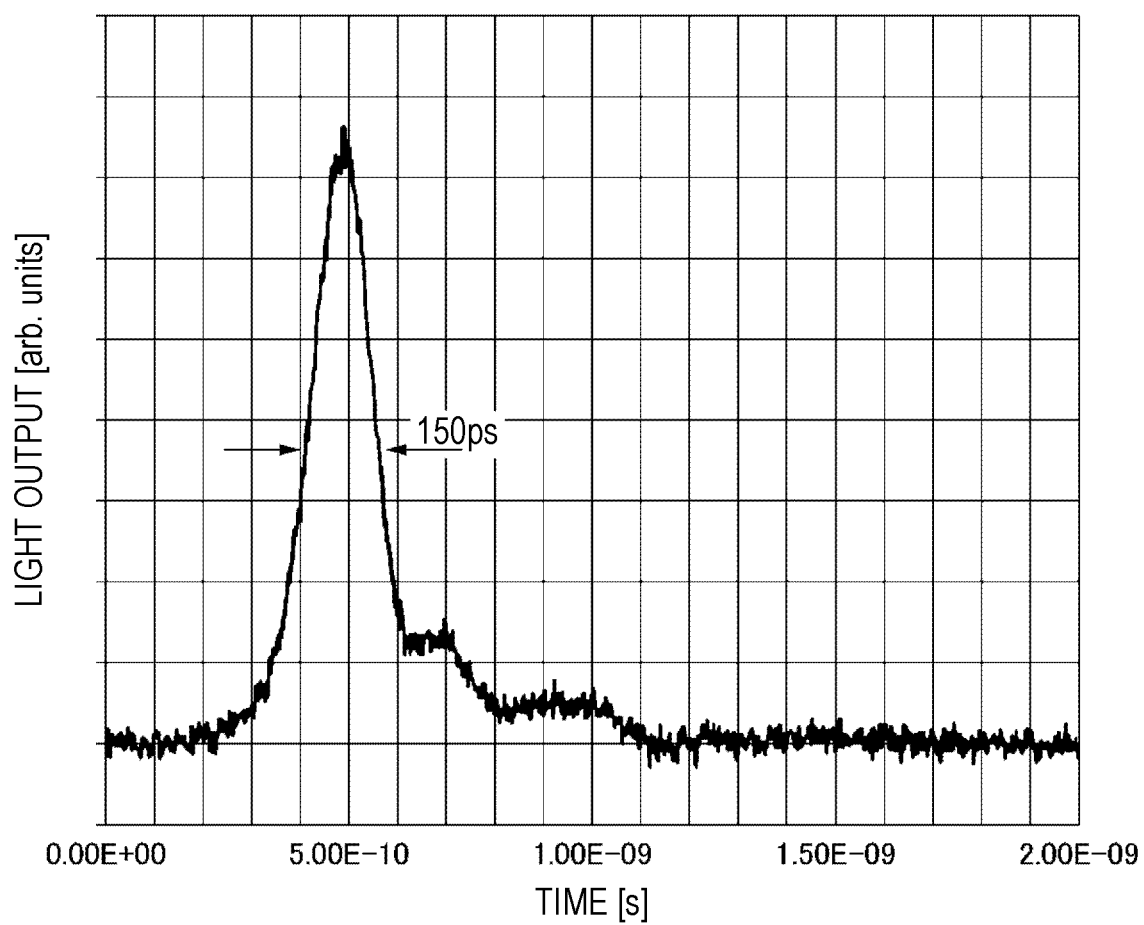
FIG. 2 is a view illustrating an example of a profile of pulse light.

The light projection unit 5 is provided with, for example, a light projecting unit 5a and a control unit 5b. The light projecting unit 5a is provided with, for example, a semiconductor laser and a laser diode driver for driving the semiconductor laser. Pulse current is intermittently injected from the laser diode driver, so that pulse light is emitted from the semiconductor laser. As an example, FIG. 2 illustrates a profile of the pulse light obtained when a current pulse having a half-value width of 1.5 nanoseconds (ns) is injected to the semiconductor laser. This is the pulse light having a half-value width of approximately 150 (picoseconds (ps)) which is sufficiently smaller than a half-value width of the injected current pulse.

The control unit 5b manages timing at which the laser diode driver in the light projecting unit 5a injects the current. As a result, a reference pulse set row having an arbitrary time interval is projected to (irradiates) an object to be measured MT from the light projection unit 5. For example, in a case where the light projecting unit 5a includes the semiconductor laser and the laser diode driver, it is possible to form a pulse set row with a pulse interval ti by allowing the laser diode driver to operate at an arbitrary time interval ti. However, since the current pulse width in this example is 1.5 ns, ti>1.5 ns is established. Meanwhile, the pulse set row (reference pulse set row and reflected pulse set row) is described later in detail.

The first measurement unit 10 is provided with, for example, a first light receiving unit 101 and a first clocking unit 102. The first light receiving unit 101 is a light receiving element such as a photodiode, an avalanche photodiode, and a single photon avalanche diode, the element in which intensity of an output signal (hereinafter appropriately referred to as a light reception signal) output from the light receiving element varies depending on intensity of input light input to the light receiving element. The first light receiving unit 101 is configured to receive the reflected pulse set row obtained by reflection of the reference pulse set row projected from the light projection unit 5 by the object to be measured MT.

The first clocking unit 102 obtains timing at which the first light receiving unit 101 receives each pulse in the reflected pulse set row. For example, the first clocking unit 102 obtains timing at which a level (signal intensity) of the light reception signal excesses a threshold as the timing at which the first light receiving unit 101 receives each pulse in the reflected pulse set row by using a binary circuit such as a comparator having a predetermined detection threshold. A time digital converter (TDC) may be exemplified as such first clocking unit 102. Of course, the first clocking unit 102 is not limited to the TDC. For example, a constant fraction discriminator (CFD) and the like which adds an attenuation waveform of a predetermined waveform to a waveform obtained by inverting with delay the predetermined waveform to detect a zero-cross point may also be used.

The second measurement unit 20 is provided with, for example, a second light receiving unit 201 and a second clocking unit 202. The second light receiving unit 201 is a light receiving element such as a photodiode, an avalanche photodiode, and a single photon avalanche diode, the element in which intensity of a light reception signal output from the light receiving element varies depending on intensity of input light input to the light receiving element. Meanwhile, the second light receiving unit 201 may be the same light receiving unit as the first light receiving unit 101 or different from that. The second light receiving unit 201 is configured to receive the reference pulse set row obtained by reflection of the reference pulse set row projected from the light projection unit 5 by a beam splitter BS.

The second clocking unit 202 obtains timing at which the second light receiving unit 201 receives each pulse in the reference pulse set row. For example, the second clocking unit 202 obtains timing at which the level of the light reception signal excesses a threshold as the timing at which the second light receiving unit 201 receives each pulse in the reference pulse set row by using a binary circuit such as a comparator having a predetermined detection threshold. As such second clocking unit 202, the above-described TDC, CFD and the like may be exemplified.

Meanwhile, the configurations of the first measurement unit 10 and the second measurement unit 20 may be appropriately changed. For example, the first measurement unit 10 may be provided with a converting unit which converts the reception signal output from the first light receiving unit 101 from a current signal to a voltage signal and an amplifying unit which amplifies the level of the light reception signal.

The identifying unit 30 includes a microcomputer, a field programmable gate array (FPGA) and the like. On the basis of the timing at which each pulse in the reference pulse set row and the reflected pulse set row is received obtained by the first and second measurement units 10 and 20, respectively, the identifying unit 30 identifies the reflected pulse set row corresponding to the reference pulse set row.

The calculating unit 40 includes a microcomputer, a FPGA and the like. The calculating unit 40 calculates the distance to the object to be measured MT on the basis of a delay time difference between the reference pulse set row and the reflected pulse set row corresponding to the reference pulse set row. Meanwhile, a process of calculating the distance may be performed at appropriate timing such as in one frame unit to be described later.

The look-up table 50 stores the pulse interval in the reference pulse set row. The look-up table 50 is connected to the identifying unit 30 and is configured such that the identifying unit 30 may refer to the information stored (stored) in the look-up table 50.

[Operation Example of Ranging Device]

Figure 3:
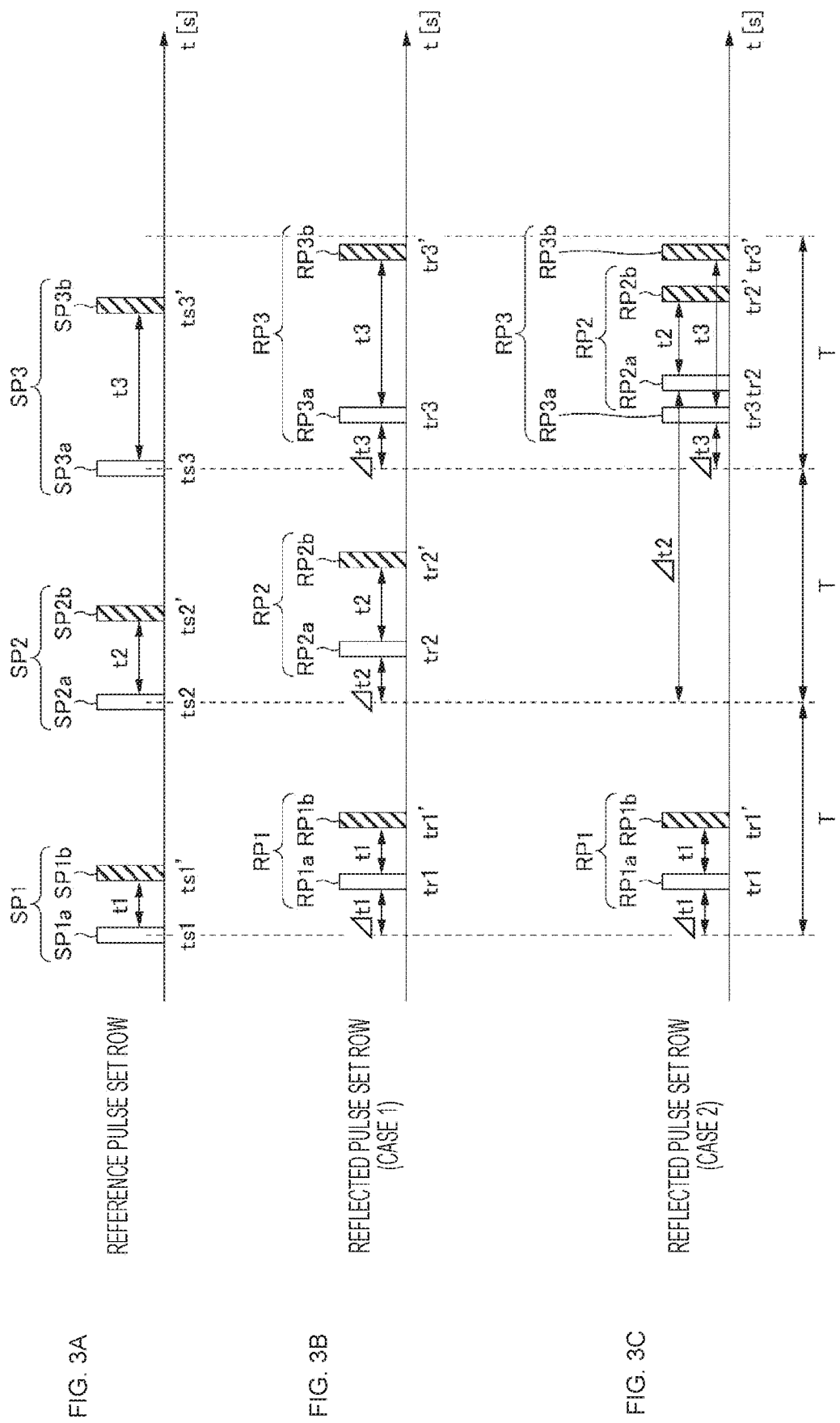
FIGS. 3A 3B, and 3C are views for illustrating an operation example and the like of the ranging device according to the first embodiment.

Next, an operation example of the ranging device 1 is described with reference to FIGS. 3A 3B, and 3C. First, the reference pulse set row, the reflected pulse set row, and the pulse interval are described. The light projection unit 5 projects the reference pulse set row to the object to be measured MT. As illustrated in FIG. 3A, the reference pulse set row includes a plurality of pulses. Meanwhile, in the drawing, each pulse is schematically represented by a bar having a width. In the following description, a first pulse in the pulse set row is referred to as a main pulse, and a pulse other than the first pulse is referred to as a sub pulse.

For example, a reference pulse set row SP1 includes a combination of a main pulse SP1a and a sub pulse SP1b. Also, a reference pulse set row SP2 includes a combination of a main pulse SP2a and a sub pulse SP2b, and a reference pulse set row SP3 includes a combination of a main pulse SP3a and a sub pulse SP3b. Although three reference pulse set rows are illustrated in the drawing, there is no limitation, and it is possible to use an arbitrary number of (for example, 100 with 100 types of pulse intervals to be described later) reference pulse set rows. For example, this arbitrary number of reference pulse set rows are made one frame, and after the reference pulse set rows of a first frame are projected, the reference pulse set rows of a next frame (second frame) are projected at a predetermined repetition period. Meanwhile, in the following description, in a case where it is not necessary to distinguish the respective reference pulse set rows, they are referred to as the reference pulse set rows SP for short.

The pulse interval is defined by the time interval between the main pulse and the sub pulse. In this example, the pulse interval of the reference pulse set row SP1 is t1 which is a time interval between the main pulse SP1a and the sub pulse SP1b, the pulse interval of the reference pulse set row SP2 is t2 which is a time interval between the main pulse SP2a and the sub pulse SP2b, and the pulse interval of the reference pulse set row SP3 is t3 which is a time interval between the main pulse SP3a and the sub pulse SP3b. In this embodiment, these pulse intervals t1, t2, and t3 are set to different values (for example, t1<t2<t3).

The reflected pulse set row obtained by the reflection of the reference pulse set row SP by the object to be measured MT also includes a combination of the main pulse and the sub pulse. For example, a reflected pulse set row RP1 obtained by the reflection of the reference pulse set row SP1 by the object to be measured MT includes a combination of a main pulse RP1a and a sub pulse RP1b. A reflected pulse set row RP2 obtained by the reflection of the reference pulse set row SP2 by the object to be measured MT includes a combination of a main pulse RP2a and a sub pulse RP2b. A reflected pulse set row RP3 obtained by the reflection of the reference pulse set row SP3 by the object to be measured MT includes a combination of a main pulse RP3a and a sub pulse RP3b. Although three reflected pulse set rows are illustrated in the drawing, in general, there are the reflected pulse set rows of the number corresponding to the number of the reference pulse set rows. Meanwhile, in a case where it is not necessary to distinguish the respective reflected pulse set rows, they are referred to as the reflected pulse set rows RP for short.

Next, the operation example of the ranging device 1 is described. First, the reference pulse set row SP is projected from the light projection unit 5 to the object to be measured MT. Specifically, the laser diode driver of the light projecting unit 5a is driven under the control of the control unit 5b, and the reference pulse set row SP having a predetermined pulse interval is projected from the light projecting unit 5a. Meanwhile, the light projection unit 5 emits the reference pulse set row SP at a constant period T, for example. The reference pulse set row SP projected from the light projection unit 5 is branched by the beam splitter BS, one of which is reflected by the object to be measured MT to be received by the first light receiving unit 101 as the reflected pulse set row RP, and the other is received by the second light receiving unit 201.

In description of subsequent operation, for easier understanding, it is described in two cases (case 1 and case 2). The case 1 is a case where the object to be measured MT is in a position relatively closer and the like, the case where the reflected pulse set row RP is received within a period T, that is, before a next reference pulse set row SP is projected. The case 2 is a case where only the object the distance to which is measured by using a predetermined reference pulse set row SP (for example, the reference pulse set row SP2) is located far and the like, the case where the reflected pulse set row RP is not received within the period T, that is, before the next reference pulse set row SP is projected.

The case 1 is first described. In response to receiving the reference pulse set rows SP1, SP2, and SP3, the light reception signal is output from the second light receiving unit 201. The second clocking unit 202 obtains timings at which the main pulse and the sub pulse of the reference pulse set row SP are received and outputs the obtained timings to the identifying unit 30. Specifically, the second clocking unit 202 obtains timings ts1 and ts1' at which the main pulse SP1a and the sub pulse SP1b of the reference pulse set row SP1 are received, respectively, and outputs the obtained timings to the identifying unit 30. Also, the second clocking unit 202 obtains timings ts2 and ts2' at which the main pulse SP2a and the sub pulse SP2b of the reference pulse set row SP2 are received, respectively, and outputs the obtained timings to the identifying unit 30. Furthermore, the second clocking unit 202 obtains timings ts3 and ts3' at which the main pulse SP3a and the sub pulse SP3b of the reference pulse set row SP3 are received, respectively, and outputs the obtained timings to the identifying unit 30.

On the other hand, the light reception signal is output from the first light receiving unit 101 which receives the reflected pulse set row RP. The first clocking unit 102 obtains the timings at which the main pulse and the sub pulse of the reflected pulse set row RP are received and outputs the obtained timings to the identifying unit 30. Specifically, the first clocking unit 102 obtains timings tr1 and tr1' at which the main pulse RP1a and the sub pulse RP1b of the reflected pulse set row RP1 are received, respectively, and outputs the obtained timings to the identifying unit 30. Also, the first clocking unit 102 obtains timings tr2 and tr2' at which the main pulse RP2a and the sub pulse RP2b of the reflected pulse set row RP2 are received, respectively, and outputs the obtained timings to the identifying unit 30. Furthermore, the first clocking unit 102 obtains timings tr3 and tr3' at which the main pulse RP3a and the sub pulse RP3b of the reflected pulse set row RP3 are received, respectively, and outputs the obtained timings to the identifying unit 30.

Since the pulse interval of a certain reference pulse set row SP and the pulse interval of the reflected pulse set row RP corresponding to the reference pulse set row SP are equal to each other or substantially equal to each other to such an extent that an included error is within an allowable range, following equations (1) to (3) are established.

$$ts1'-ts1=tr1'-tr1=t1 \tag{1}$$

$$ts2'-ts2=tr2'-tr2=t2 \tag{2}$$

$$ts3'-ts3=tr3'-tr3=t3 \tag{3}$$

The identifying unit 30 refers to the look-up table 50 and reads the pulse intervals t1, t2, and t3 stored in the look-up table 50. Then, the identifying unit 30 calculates a difference between the light reception timings in the reference pulse set row SP and identifies the reference pulse set row having the pulse interval read from the look-up table 50. For example, since there is only one set of the reference pulse set row SP1 as the reference pulse set row having the pulse interval t1, the reference pulse set row is identified as the reference pulse set row SP1.

Furthermore, the identifying unit 30 calculates a difference between the light reception timings in the reflected pulse set row RP and identifies the reflected pulse set row having the pulse interval read from the look-up table 50. For example, since there is only one set of the reflected pulse set row RP1 as the reflected pulse set row having the pulse interval t1, the reflected pulse set row is identified as the reflected pulse set row RP1. Then, the identifying unit 30 identifies that the reflected pulse set row RP1 is a pulse set row corresponding to the reference pulse set row SP1.

Subsequently, the identifying unit 30 obtains a delay time difference Δt1 (time of flight of the reference pulse set row SP1 projected from the light projection unit 5) between the reference pulse set row SP1 and the reflected pulse set row RP1 corresponding to the reference pulse set row SP1. The delay time difference Δt1 may be obtained, for example, by a difference between the timing ts1 at which the main pulse SP1a in the reference pulse set row SP1 is received and the timing tr1 at which the main pulse RP1a in the reflected pulse set row RP1 is received. This may also be obtained by the difference between the timings at which the sub pulses of them are received. Then, the identifying unit 30 outputs the obtained delay time difference Δt1 to the calculating unit 40.

The calculating unit 40 calculates the distance to the object to be measured MT on the basis of the delay time difference Δt1. For example, the calculating unit 40 calculates the distance to the object to be measured MT by multiplying the delay time difference Δt1 by the light speed and dividing a result thereof by two. Up to the calculated distance to the object to be measured MT is output from the calculating unit 40 and used according to application.

The case 2 is next described. The similar process is performed also for the case 2. Meanwhile, the description overlapping with the description regarding the above-described case 1 is briefly described.

The timings at which the main pulse and the sub pulse in the reference pulse set row SP are received are obtained by the second measurement unit 20. Furthermore, the timings at which the main pulse and the sub pulse in the reflected pulse set row RP are received are obtained by the first measurement unit 10. The first and second measurement units 10 and 20 output the obtained timings to the identifying unit 30.

The identifying unit 30 identifies the reference pulse set rows including the pulse intervals t1, t2, and t3 read from the look-up table 50. For example, the identifying unit 30 obtains all the differences between the timings supplied from the first and second measurement units for each measurement unit, and performs a matching process between the differences and the pulse intervals t1, t2, and t3. Meanwhile, regarding the reference pulse set row SP, a pair of pulses received temporally earlier may be identified as the reference pulse set row SP1 and a pair of pulses received next may be identified as the reference pulse set row SP2, and it is possible that the matching process is performed only on the reflected pulse set row RP.

As illustrated in FIG. 3C, by the matching process, the reflected pulse set row with the pulse interval t2 is identified as the reflected pulse set row RP2. This makes it possible to identify the reflected pulse set row RP2 and the reference pulse set row SP2 corresponding to the same, and it becomes possible to identify the reference time with respect to the reflected pulse set row RP2 (in this example, timing ts2 at which the main pulse SP2a of the reference pulse set row SP2 is received). Therefore, the identifying unit 30 may correctly obtain a delay time difference Δt2 with respect to the reference time. That is, even in a case where the light reception time of the reflected pulse set row RP is longer than the repetition period of the output of the reference pulse set row SP, it is possible to obtain an appropriate delay time difference Δt2, so that it is possible to appropriately calculate the distance to the object to be measured MT measured by using the reference pulse set row SP2 by the calculating unit 40 at a subsequent stage.

Meanwhile, in a case where the object to be measured MT is the moving object, if the object to be measured changes its position from the irradiation of the main pulse to the irradiation of the sub pulse, the time interval between the main pulse and the sub pulse is not always kept constant. In such a case, the time interval of the pulse set row must be set sufficiently smaller than moving time (speed) of the moving object. However, in order to obtain position information of the moving object, it is necessary to perform the ranging at a repetition frequency f (Hz) sufficiently faster than the moving time (speed) of the moving object, and at that time, if the time interval between the main pulse and the sub pulse is set within the repetition period 1/f (s) and the like, the error is almost ignorable.

The first embodiment is described above. According to the first embodiment, it is possible to increase the repetition frequency of the projection of the pulse set row from the light projection unit 5 without limitation by the distance to the object to be measured MT. Also, in one-point ranging, by performing N times of measurement, statistically, a standard error thereof may be made 1/√N, and drastically highly accurate ranging becomes possible. Also, in multi-point measurement in which a scanning system is provided in the light projection unit 5, it is possible to increase the repetition frequency of the projection of the pulse set row from the light projection unit 5, so that high-density and high-accurate two-dimensional ranging may be realized. Also, it becomes unnecessary to prepare separate systems depending on the distance to the object to be measured MT. Also, it is possible to perform the ranging on an object having a large distance dynamic range (a large distance depth).

Variation of First Embodiment

Figure 4:
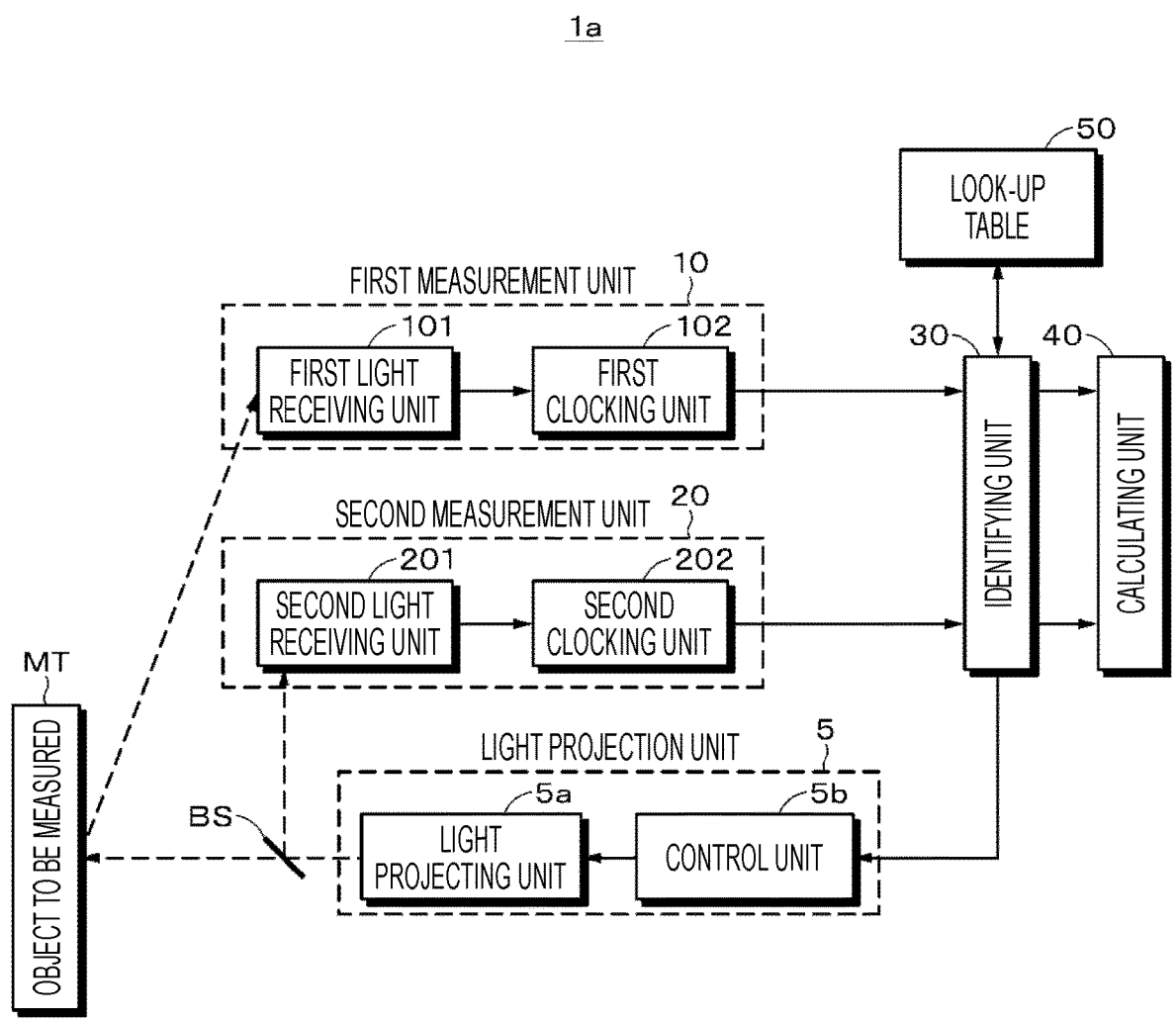
FIG. 4 is a block diagram for illustrating a variation of the ranging device according to the first embodiment.

The first embodiment may be modified as exemplified below. FIG. 4 illustrates a configuration example of a ranging device 1a according to the variation. In the ranging device 1a, an identifying unit 30 and a control unit 5b in a light projection unit 5 may be connected to each other. Then, it may be configured that a pulse interval t1 and the like read by the identifying unit 30 is supplied to the control unit 5b.

Then, the control unit 5b may control a light projecting unit 5a such that a reference pulse set row SP1 and the like having the pulse interval t1 and the like supplied from the identifying unit 30 is projected.

Figure 5:
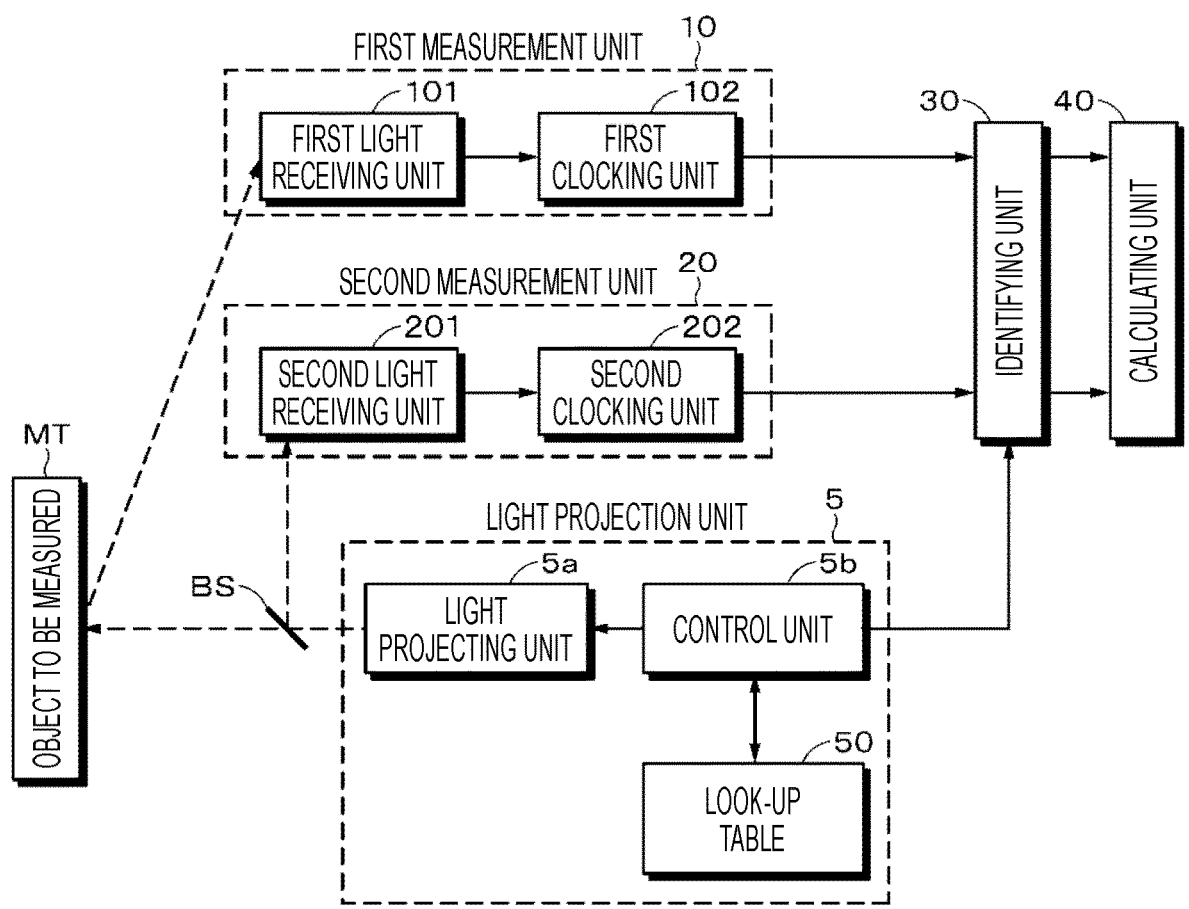
FIG. 5 is a block diagram for illustrating a variation of the ranging device according to the first embodiment.

FIG. 5 illustrates a configuration example of a ranging device 1b according to another variation. The ranging device 1b may be configured such that a look-up table 50 in which a pulse interval is described is provided on a light projection unit 5. Then, a control unit 5b may be configured to be able to read the pulse interval stored in the look-up table 50. The control unit 5b controls a light projecting unit 5a such that a reference pulse set row SP1 and the like having a pulse interval t1 and the like read from the look-up table 50 is projected. Also, the control unit 5b supplies the pulse interval t1 and the like read from the look-up table 50 to the identifying unit 30. Even with the configurations illustrated in FIGS. 4 and 5, it is possible to obtain an action effect similar to that in the first embodiment.

2. Second Embodiment

Next, a second embodiment is described. Meanwhile, in the following description, the same name and reference sign designate the same or similar member unless otherwise specified, and redundant description is appropriately omitted. Also, the matters described in the first embodiment are applicable to the second embodiment unless otherwise specified.

Figure 6:
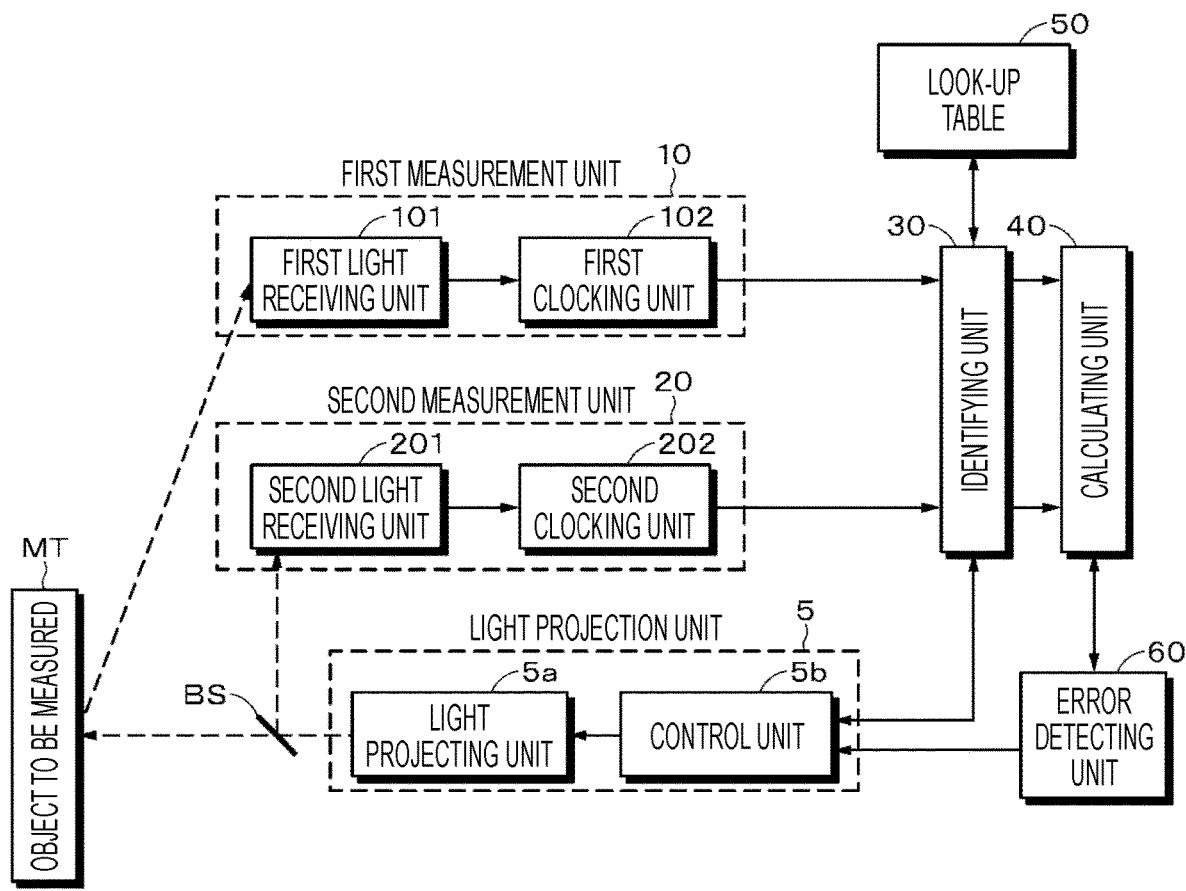
FIG. 6 is a block diagram for illustrating a configuration example of a ranging device according to a second embodiment.

FIG. 6 is a block diagram for illustrating a configuration example of a ranging device (ranging device 2) according to the second embodiment of the present disclosure. The ranging device 2 is different from the ranging device 1 in that this is provided with an error detecting unit 60, for example. The error detecting unit 60 is connected to a control unit 5b in a light projection unit 5 and a calculating unit 40. In a case where a variation (deviation) equal to or larger than a threshold occurs in a distance calculated by the calculating unit 40, the error detecting unit 60 determines that an error occurs in a result of calculating the distance and feeds back a determination result to the control unit 5b.

Figure 7:
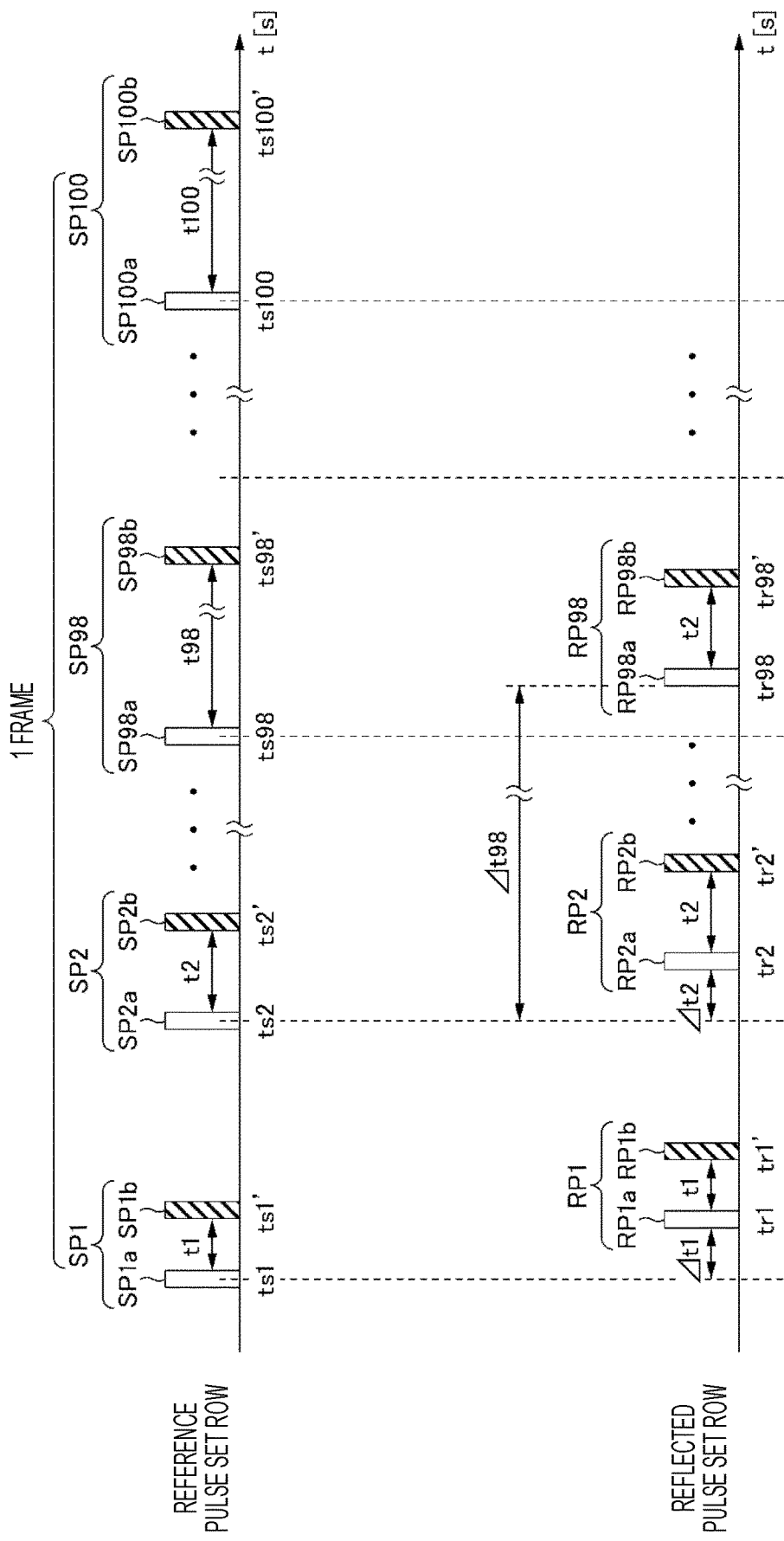
FIG. 7 is a view for illustrating an example of an error that might occur in a ranging result.

FIG. 7 is a view for illustrating an example of the error which might occur in the distance calculated by the calculating unit 40. In the example illustrated in FIG. 7, 100 reference pulse set rows SP1, SP2, . . . , and SP100 having 100 types of pulse intervals t1, t2, . . . , and t100, respectively, are taken as one frame unit and the reference pulse set rows SP are projected on an object to be measured MT in this frame unit.

As illustrated in FIG. 7, it is assumed that a pulse interval of a reflected pulse set row RP2 is appropriately determined as t2 by an identifying unit 30. However, it is assumed that, for example, the pulse interval of the reflected pulse set row RP98 is also determined to be t2 for some reasons (for example, in a case where the distance to the object to be measured MT exceeds a ranging range in which ranging may be performed and the like). That is, the identifying unit 30 determines that there are two reflected pulse set rows RP corresponding to the reference pulse set row SP2 having the pulse interval t2 (reflected pulse set rows RP2 and RP98).

In accordance with a determination result of the identifying unit 30, a delay time difference is obtained. Reference time with respect to the reflected pulse set row RP2 is ts2, and Δt2 is obtained with respect to ts2. The reference time with respect to the reflected pulse set row RP98 should originally be ts98, but as described above, it is determined that ts2 temporally earlier than ts98 is the reference time. Therefore, Δt98 becomes larger than an appropriate value.

The calculating unit 40 calculates the distance to the object to be measured MT by multiplying Δt98 by a light speed and dividing a multiplication result by two. The value of Δt98 becomes large, so that the distance might be calculated to be larger than the original appropriate distance obtained by a distance calculating process.

Figure 8:
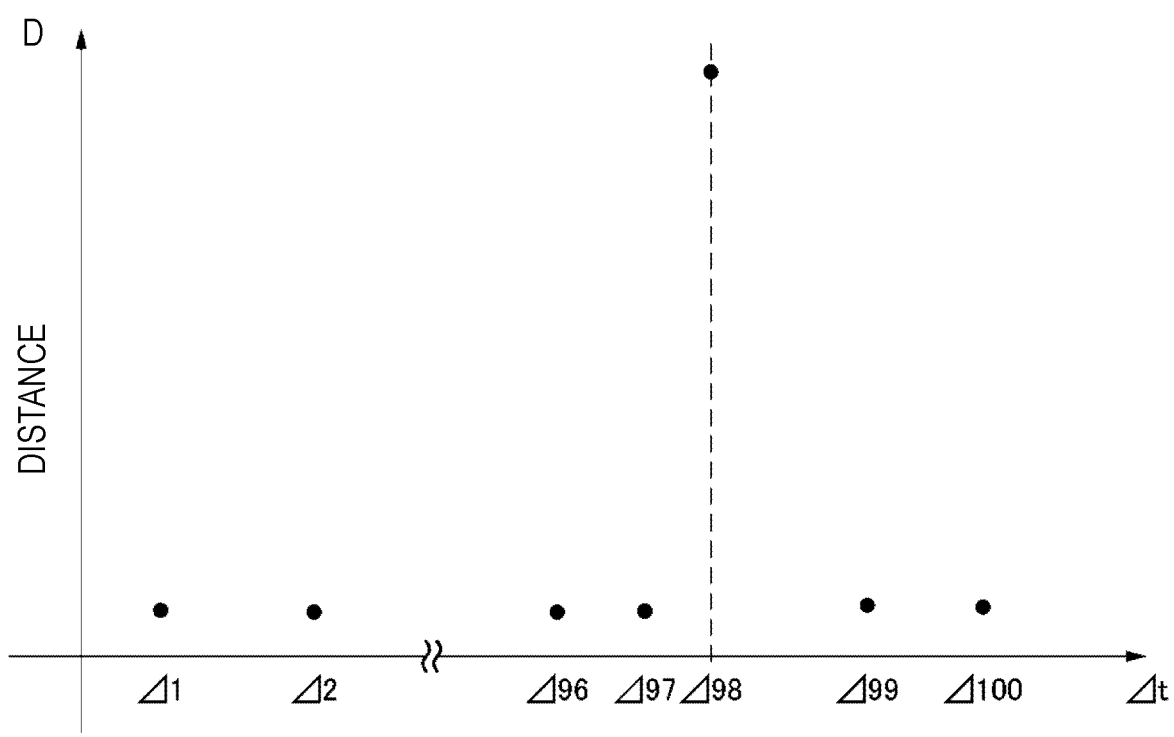
FIG. 8 is a view for illustrating an example of an error that might occur in the ranging result.

FIG. 8 is a graph schematically illustrating the distance obtained by the process executed by the calculating unit 40. In the graph in FIG. 8, the value of Δt is plotted along the abscissa, and a distance D calculated by using Δt is plotted along the ordinate. In general, the calculated distance falls within a range of a certain threshold (for example, ranging range). However, the distance calculated by using Δt98 described above might exceed the range of the threshold. In a case where such a result is obtained by the distance calculating process by the calculating unit 40, the error detecting unit 60 determines that there is the error in the distance calculation result and feeds back a determination result to the control unit 5b.

In a case where the error is detected, the control unit 5b changes the pulse interval in a next frame and controls the light projecting unit 5a such that the reference pulse set row SP based on the changed pulse interval is projected. Furthermore, the control unit 5b outputs the changed pulse interval to the identifying unit 30 and instructs the identifying unit 30 to rewrite the pulse interval stored in the look-up table 50 to the changed pulse interval. This makes it possible to reduce probability of occurrence of erroneous detection in the distance calculating process using the reference pulse set row SP in the next frame. Meanwhile, all the pulse intervals may be changed or only the pulse interval in which the error occurs (the pulse interval t98 in the above-described example) may be changed. Also, the identifying unit 30 may hold (store) the changed pulse interval supplied from the control unit 5b without rewriting the look-up table 50.

3. Third Embodiment

Next, a third embodiment is described. Meanwhile, in the following description, the same name and reference sign designate the same or similar member unless otherwise specified, and redundant description is appropriately omitted. Also, the matters described in the first and second embodiments are applicable to the third embodiment unless otherwise specified.

Figure 9A:
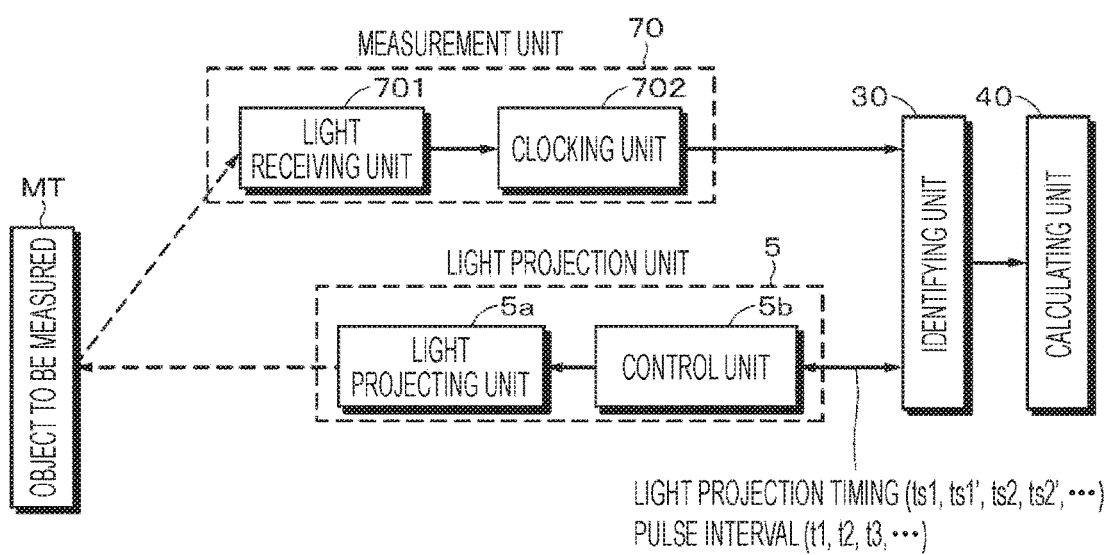
FIGS. 9A and 9B are views for illustrating a configuration example and the like of a ranging device according to a third embodiment.

FIG. 9A is a block diagram for illustrating a configuration example of a ranging device (ranging device 3) according to the third embodiment of the present disclosure. The ranging device 3 is different from the ranging devices 1 and 2 in the above-described first and second embodiments, respectively, in that this is provided with only one measurement unit 70 and is not provided with two measurement units.

The ranging device 3 has a configuration in which a control unit 5b and an identifying unit 30 are connected to each other so that communication is possible. With this configuration, the control unit 5b may supply timings (ts1, ts1', ts2, ts2' and the like described above) at which a reference pulse set row SP is projected and pulse intervals (t1, t2 and the like described above) in the reference pulse set row to the identifying unit 30.

The measurement unit 70 is provided with, for example, a light receiving unit 701 and a clocking unit 702. The light receiving unit 701 is a light receiving element which receives a reflected pulse set row obtained by reflection of the reference pulse set row projected from the light projection unit 5 by an object to be measured MT as the first light receiving unit 101. Also, as the first clocking unit 102, the clocking unit 702 obtains timing at which the light receiving unit 701 receives each pulse in the reflected pulse set row.

Figure 9B:
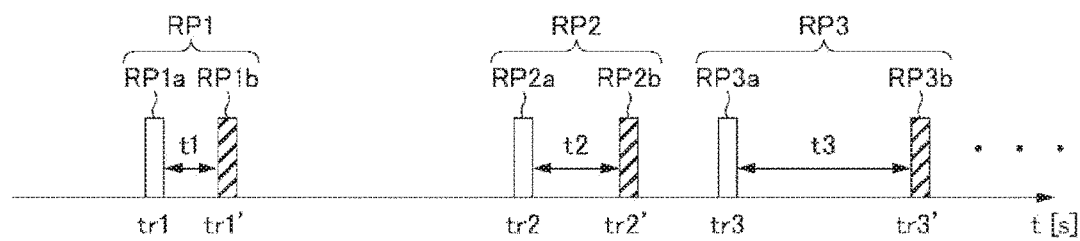

FIG. 9B is a view illustrating an example of a reflected pulse set row RP received by the light receiving unit 701 and timings at which a main pulse and a sub pulse forming the reflected pulse set row RP are received.

An operation example of the ranging device 3 is described. The reflected pulse set row RP obtained by reflection of a reference pulse set row SP projected by the light projection unit 5 by the object to be measured MT is received by the light receiving unit 701. Then, the timings (tr1, tr1' and the like) at which the reflected pulse set row RP is received are determined by the clocking unit 702 and a determination result is output to the identifying unit 30.

The identifying unit 30 obtains the pulse interval between the pulses in the received reflected pulse set row RP, identifies the pulse set row corresponding to the pulse interval supplied from the control unit 5b, and identifies the individual reflected pulse set row RP. For example, a pair of pulses having a pulse interval t2 is identified as a reflected pulse set row RP2. Then, the identifying unit 30 obtains a delay time difference Δt from light reception timing of the identified reflected pulse set row RP and light projection timing supplied from the control unit 5b. For example, in a case of the reflected pulse set row RP2, Δt2 is obtained by obtaining a difference between ts2 which is the light projection timing and tr2 which is the timing at which the main pulse of the reflected pulse set row RP2 is received. The identifying unit 30 outputs the obtained delay time difference Δt to the calculating unit 40. Then, the calculating unit 40 calculates the distance to the object to be measured MT by multiplying Δt by a light speed and dividing a multiplication result by two.

Figure 10A:
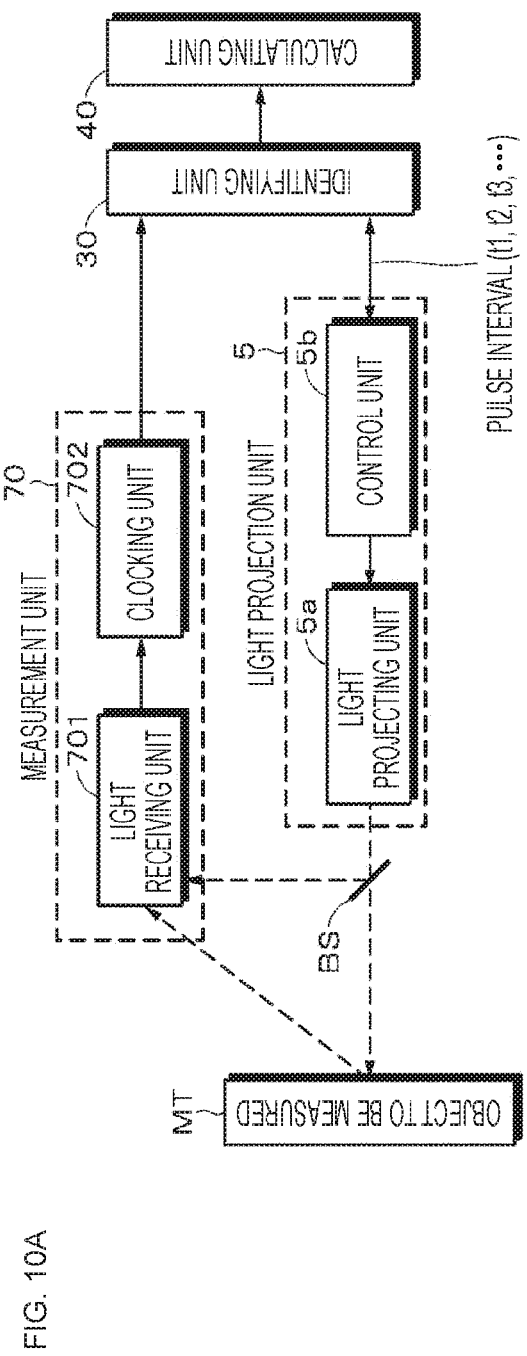
FIG. 10A and FIG. 10B are views for illustrating a variation and the like of the ranging device according to the third embodiment.

The third embodiment may be modified as exemplified below. FIG. 10A is a block diagram illustrating a configuration example regarding a variation (ranging device 3a) of the ranging device 3. The ranging device 3a is provided with a beam splitter BS and is configured such that a light receiving unit 701 receives a reference pulse set row SP projected from a light projection unit 5. Also, at least pulse intervals (t1, t2 and the like described above) may be supplied from a control unit 5b to an identifying unit 30.

Figure 10B:
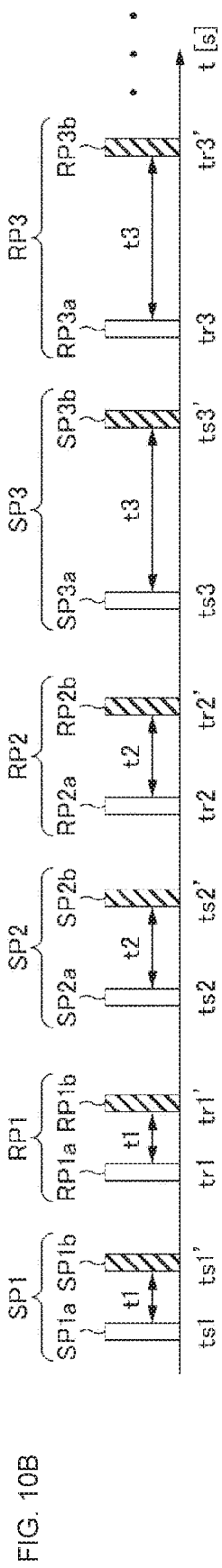

FIG. 10B is a view illustrating the reference pulse set row SP and a reflected pulse set row RP received by the light receiving unit 701, the view illustrating an example of timings at which a main pulse and a sub pulse forming the reference pulse set row SP and the reflected pulse set row RP are received. Meanwhile, the reference pulse set row SP and the reflected pulse set row RP illustrated in FIG. 10B are merely an example and they are not necessarily received in the illustrated order.

An operation example of the ranging device 3a is described. The reference pulse set row SP projected from the light projection unit 5 and the reflected pulse set row RP obtained by the reflection of the reference pulse set row SP by the object to be measured MT are received by the light receiving unit 701. Then, a clocking unit 702 determines timings (ts1, ts1', tr1, tr1' and the like) at which the main pulse and the sub pulse forming each of the reference pulse set row SP and the reflected pulse set row RP are received are determined, and a determination result is output to the identifying unit 30.

For example, the identifying unit 30 obtains the pulse interval between all the received pulses, identifies the pulse set row coinciding with the pulse interval supplied from the control unit 5b, and identifies the individual reference pulse set row SP and reflected pulse set row RP. For example, a pair of pulses having a pulse interval t2 is identified, and out of them, a pair of pulse set rows received temporally earlier is identified as a reference pulse set row SP2, and a pair of pulse set rows received temporally later is identified as a reflected pulse set row RP2. Then, on the basis of the identification result, the identifying unit 30 obtains a delay time difference Δt between the reference pulse set row SP and the corresponding reflected pulse set row RP. For example, the difference between the timing at which the main pulse of the reference pulse set row SP is received and the timing at which the main pulse of the reflected pulse set row RP corresponding to the reference pulse set row SP is received is obtained as the delay time difference Δt. The identifying unit 30 outputs the obtained delay time difference Δt to the calculating unit 40. Then, the calculating unit 40 calculates the distance to the object to be measured MT by multiplying Δt by a light speed and dividing a multiplication result by two. As described above, the present disclosure may also be realized by a configuration provided with at least one measurement unit.

4. Variation

Although a plurality of embodiments of the present disclosure is heretofore described specifically, the contents of the present disclosure are not limited to the above-described embodiments and various modifications based on the technical idea of the present disclosure are possible. Hereinafter, a variation is described.

Figure 11:
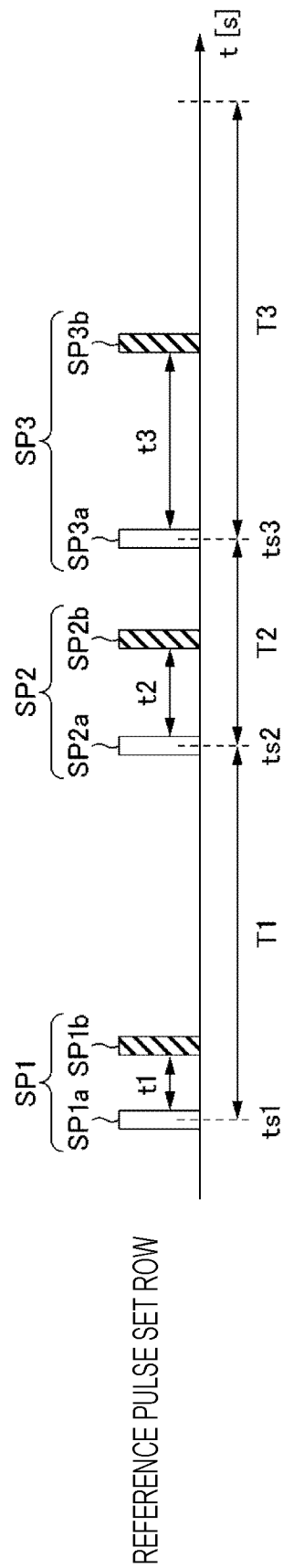
FIG. 11 is a view for illustrating a variation.

Although an example in which a light projection unit 5 projects a reference pulse set row SP at a constant period (constant repetition frequency) is described in the above-described embodiments, the present invention is not limited thereto. For example, as illustrated in FIG. 11, the reference pulse set row SP may be projected from the light projection unit 5 at different periods T1, T2, T3 and the like (different repetition frequencies).

In the above-described embodiments, a pulse interval may be made variable irrespective of presence or absence of an error. For example, the pulse interval may be changed by a predetermined algorithm, or this may be determined by a totally random number. As a result, it is possible to reduce probability of occurrence of the error in a calculated distance. Meanwhile, it is preferable that the pulse interval is appropriately determined according to a distance to an object to be measured MT.

Although the example is described in which one sub pulse is included in the reference pulse set row in the above-described embodiments, two or more sub pulses may also be included. For example, the reference pulse set row may include three pulses (one main pulse and two sub pulses), and in this case, the identifying unit 30 may identify a reflected pulse set row corresponding to the reference pulse set row by using the pulse interval between the main pulse and a first sub pulse and the pulse interval between the main pulse and a second sub pulse. This makes it possible to more correctly identify the reflected pulse set row corresponding to the reference pulse set row.

In consideration of the error and the like, a pulse interval t used for an identifying process may be set. For example, when identifying a reflected pulse set row RP1 corresponding to a reference pulse set row SP1 having the pulse interval t1, a pair of pulses having the pulse interval t1±p (p is a value appropriately set in consideration of the error) may be identified as the reflected pulse set row RP1 corresponding to the reference pulse set row SP1.

It is also possible that the process described in the above-described embodiments (for example, a matching process by the identifying unit 30) is performed only in a case where the reflected pulse set row RP is received after a period of the reference pulse set row SP projected from the light projection unit 5.

Determination of whether there is the error described with reference to FIG. 8 is not limited to the method in the above-described embodiments. For example, it is also possible to perform a process of comparing with several data before and after in FIG. 8 or with data in a previous frame to determine whether there is the error according to a comparison result.

In the present disclosure, for example, the configuration, the method, the step, the shape, the material, the numerical value and the like described in the above-described embodiments are merely examples, and the configuration, the method, the step, the shape, the material, the numerical value and the like different from those may also be used as necessary. Also, the present disclosure may be realized by a device, a method, a system including a plurality of devices and the like, and the matters described in a plurality of embodiments and variations may be combined with one other as long as technical inconsistency does not occur.

For example, in the third embodiment, the ranging device 3 or the ranging device 3a may include an error detecting unit. In addition, in a case where two or more same pulse intervals are identified as a result of the process by the identifying unit 30, it is possible to determine that the error occurs and change the pulse interval.

In each of the above-described embodiments, an electrical connection relationship between the configurations may be wired connection using a cable and the like, or wireless communication based on a predetermined communication standard.

In addition to the ranging device of the present disclosure alone, it is possible to apply to a device in which the ranging device is incorporated (for example, various electronic devices such as a projector device, a game device, and an imaging device, a safety device which detects a distance to a pedestrian, an obstacle and the like and activates a brake depending on the distance, a movable body such as an automobile, a train, an airplane, a helicopter, and a small aircraft in which such a safety device may be used, a robot, a security device and the like).

The present disclosure may be realized by not only the ranging device but also the components of the ranging device, the configuration serving to obtain an action effect of the present disclosure. For example, the present disclosure may be realized by a signal processing device including a configuration of receiving a reflected pulse set row and an identifying unit, and may further be realized by a signal processing device including a calculating unit. Also, the present disclosure may also be realized as a light projecting device including a light projection unit.

Meanwhile, the present disclosure may also have the following configurations.

(1)

A ranging device provided with:

a light projecting unit for projecting a reference pulse set row including a main pulse and at least one sub pulse;

a light receiving unit for receiving a reflected pulse set row obtained by reflection of the reference pulse set row by an object to be measured;

an identifying unit for identifying the reflected pulse set row corresponding to the reference pulse set row; and a calculating unit for calculating a distance to the object to be measured on the basis of a delay time difference between the reference pulse set row and the reflected pulse set row corresponding to the reference pulse set row, in which the light projecting unit is configured to project a plurality of reference pulse set rows having different pulse intervals.

(2)

The ranging device according to (1), further provided with:

another light receiving unit for receiving the reference pulse set row projected from the light projecting unit.

(3)

The ranging device according to (2), further provided with:

a first cocking unit for obtaining timing at which the light receiving unit receives the reflected pulse set row; and a second clocking unit for obtaining timing at which the other light receiving unit receives the reference pulse set row.

(4)

The ranging device according to any one of (1) to (3), further provided with:

a storage unit for storing the pulse intervals, in which the identifying unit refers to a pulse interval stored in the storage unit and identifies the reflected pulse set row corresponding to the reference pulse set row.

(5)

The ranging device according to any one of (1) to (4), in which a pulse interval is made variable.

(6)

The ranging device according to any one of (1) to (5), further provided with:

an error detecting unit for detecting whether an error is included in the distance calculated by the calculating unit.

(7)

The ranging device according to (6), in which, in a case where the error is detected by the error detecting unit, the light projecting unit changes the pulse intervals in the plurality of reference pulse set rows.

(8)

The ranging device according to any one of (1) to (7), configured such that at least information indicating the pulse intervals is supplied from the light projecting unit to the identifying unit.

(9)

A ranging method provided with:

projecting a reference pulse set row including a main pulse and at least one sub pulse by a light projecting unit;

receiving a reflected pulse set row obtained by reflection of the reference pulse set row by an object to be measured by a light receiving unit;

identifying the reflected pulse set row corresponding to the reference pulse set row by an identifying unit; and calculating a distance to the object to be measured on the basis of a delay time difference between the reference pulse set row and the reflected pulse set row corresponding to the reference pulse set row by a calculating unit, in which the light projecting unit projects a plurality of reference pulse set rows having different pulse intervals.

(10)

A signal processing device provided with:

a light receiving unit for receiving a reflected pulse set row obtained by reflection of a reference pulse set row including a main pulse and at least one sub pulse by an object to be measured; and an identifying unit for identifying the reflected pulse set row corresponding to a predetermined reference pulse set row out of a plurality of reference pulse set rows having different pulse intervals.

(11)

The signal processing device according to (10), further provided with:

a calculating unit for calculating a distance to the object to be measured on the basis of a delay time difference between the reference pulse set row and the reflected pulse set row corresponding to the reference pulse set row.

(12)

A light projecting device for projecting pulse light for performing optical ranging, provided with:

a light projecting unit configured to project a reference pulse set row including a main pulse and at least one sub pulse and to project a plurality of reference pulse set rows having different pulse intervals.

REFERENCE SIGNS LIST 1, 1a, 1b, 2, 3, 3a Ranging device
5 Light projection unit
10 First measurement unit
20 Second measurement unit
30 Identifying unit
40 Calculating unit
50 Look-up table
60 Error detecting unit
70 Measurement unit
101 First light receiving unit
102 First clocking unit
201 Second light receiving unit
202 Second clocking unit
701 Light receiving unit
702 Clocking unit
SP Reference pulse set row
RP Reflected pulse set row
MT Object to be measured

The invention claimed is:

1. A ranging device, comprising:
a light projecting unit configured to project a plurality of reference pulse set rows on an object, wherein
each reference pulse set row of the plurality of reference pulse set rows includes a main pulse and at least one sub pulse, and
a first pulse interval between the main pulse and the at least one sub pulse of a first reference pulse set row of the plurality of reference pulse set rows is different from a second pulse interval between the main pulse and the at least one sub pulse of a second reference pulse set row of the plurality of reference pulse set rows;
a first light receiving unit configured to receive a reflected pulse set row obtained by reflection of the first reference pulse set row by the object;
an identifying unit configured to identify the reflected pulse set row corresponding to the first reference pulse set row;
a calculating unit configured to calculate a distance to the object based on a delay time difference between the first reference pulse set row and the reflected pulse set row; and
an error detecting unit configured to determine a presence of an error in the calculated distance,
wherein the light projecting unit is further configured to change the first pulse interval and the second pulse interval based on the determination of the presence of the error in the calculated distance.

2. The ranging device according to claim 1, further comprising a second light receiving unit configured to receive the first reference pulse set row projected from the light projecting unit.

3. The ranging device according to claim 2, further comprising:
a first clocking unit configured to obtain a timing at which the reflected pulse set row is received by the first light receiving unit; and
a second clocking unit configured to obtain a timing at which the first reference pulse set row is received by the second light receiving unit.

4. The ranging device according to claim 1, further comprising a storage unit configured to store the first pulse interval and the second pulse interval,
wherein the identifying unit is further configured to:
refer to the stored first pulse interval; and
identify, based on the referred first pulse interval, the reflected pulse set row corresponding to the first reference pulse set row.

5. The ranging device according to claim 1, wherein each of the first pulse interval and the second pulse interval is variable.

6. The ranging device according to claim 1, wherein the light projecting unit includes a control unit configured to supply information indicating the first pulse interval and the second pulse interval to the identifying unit.

7. A ranging method, comprising:
projecting, by a light projecting unit, a plurality of reference pulse set rows on an object, wherein
each reference pulse set row of the plurality of reference pulse set rows includes a main pulse and at least one sub pulse, and
a first pulse interval between the main pulse and the at least one sub pulse of a first reference pulse set row of the plurality of reference pulse set rows is different from a second pulse interval between the main pulse and the at least one sub pulse of a second reference pulse set row of the plurality of reference pulse set rows;
receiving, by a light receiving unit, a reflected pulse set row obtained by reflection of the first reference pulse set row by the object;
identifying, by an identifying unit, the reflected pulse set row corresponding to the first reference pulse set row;
calculating, by a calculating unit, a distance to the object based on a delay time difference between the first reference pulse set row and the reflected pulse set row;
determining, by an error detecting unit, a presence of an error in the calculated distance; and
changing, by the light projecting unit, the first pulse interval and the second pulse interval based on the determination of the presence of the error in the calculated distance.

8. A signal processing device, comprising:
a light receiving unit configured to receive a reflected pulse set row obtained by reflection of a first reference pulse set row of a plurality of reference pulse set rows by an object, wherein
each reference pulse set row of the plurality of reference pulse set rows includes a main pulse and at least one sub pulse, and
a first pulse interval between the main pulse and the at least one sub pulse of the first reference pulse set row is different from a second pulse interval between the main pulse and the at least one sub pulse of a second reference pulse set row of the plurality of reference pulse set rows;
an identifying unit configured to identify the reflected pulse set row corresponding to the first reference pulse set row;
a calculating unit configured to calculate a distance to the object based on a delay time difference between the first reference pulse set row and the reflected pulse set row; and
an error detecting unit configured to:
determine a presence of an error in the calculated distance; and
output, to a light projecting device, a result indicating the presence of the error in the calculated distance,
wherein the light projecting device changes the first pulse interval and the second pulse interval based on the result indicating the presence of the error in the calculated distance.

9. A light projecting device, comprising:
a light projecting unit configured to project a plurality of reference pulse set rows on an object, wherein
each reference pulse set row of the plurality of reference pulse set rows includes a main pulse and at least one sub pulse, and
a first pulse interval between the main pulse and the at least one sub pulse of a first reference pulse set row of the plurality of reference pulse set rows is different from a second pulse interval between the main pulse and the at least one sub pulse of a second reference pulse set row of the plurality of reference pulse set rows; and
a control unit configured to receive a result from a specific device, wherein
the specific device calculates a distance to the object,
the result indicates a presence of an error in the calculated distance, and
the light projecting unit is further configured to change the first pulse interval and the second pulse interval based on the result indicating the presence of the error in the calculated distance.

* * * * *